United States Patent
Yao (10) Patent No.: US 11,196,906 B2
(45) Date of Patent: Dec. 7, 2021

(54) ELECTRONIC DEVICE AND METHOD FOR CONTROLLING DECORATIVE MEMBER LENS

(71) Applicant: Realme Chongqing Mobile Telecommunications Corp., Ltd., Chongqing (CN)

(72) Inventor: Kun Yao, Chongqing (CN)

(73) Assignee: REALME CHONGQING MOBILE TELECOMMUNICATIONS CORP., LTD., Chongqing (CN)

( * ) Notice: Subject to any disclaimer, the term of this patent is extended or adjusted under 35 U.S.C. 154(b) by 0 days.

(21) Appl. No.: 16/909,958

(22) Filed: Jun. 23, 2020

(65) Prior Publication Data

US 2020/0412920 A1    Dec. 31, 2020

(30) Foreign Application Priority Data

Jun. 28, 2019    (CN) .......................... 201910622345.3

(51) Int. Cl.
    *H04N 5/225*    (2006.01)
(52) U.S. Cl.
    CPC ......... *H04N 5/2254* (2013.01); *H04N 5/2257* (2013.01)
(58) Field of Classification Search
    CPC ................................................... H04N 5/2251
    See application file for complete search history.

(56) References Cited

U.S. PATENT DOCUMENTS

| 2007/0098398 | A1  | 5/2007  | Hagiwara |
| 2012/0113279 | A1* | 5/2012  | Park ................... H04N 5/23296 348/208.6 |
| 2017/0331993 | A1  | 11/2017 | Xu et al. |

FOREIGN PATENT DOCUMENTS

| CN | 205792891 U | 12/2016 |
| CN | 106713557 A | 5/2017 |
| CN | 206585632 U | 10/2017 |
| CN | 108667959 A | 10/2018 |
| CN | 108769492 A | 11/2018 |
| CN | 109510929 A | 3/2019 |
| CN | 109561184 A | 4/2019 |
| CN | 110798594 A | 2/2020 |

(Continued)

OTHER PUBLICATIONS

European Search Report in the European application No. 20172983.7, dated Oct. 19, 2020.

(Continued)

*Primary Examiner* — Gary C Vieaux
(74) *Attorney, Agent, or Firm* — Ladas & Parry, LLP (57) ABSTRACT

An electronic device and a method for controlling a decorative member lens are provided. The electronic device includes a camera component, a decorative member, a decorative member lens and a driving mechanism. The camera component includes a motor and a lens. The motor is configured to drive the lens to move. The decorative member is provided relative to the camera component. The decorative member lens is mounted on the decorative member. The decorative member lens is spaced from the lens. The driving mechanism is coupled to the decorative member lens. The driving mechanism is configured to drive the decorative member lens to move away from or towards the lens.

16 Claims, 7 Drawing Sheets

(56) References Cited

FOREIGN PATENT DOCUMENTS

JP           2015219410  A     12/2015

OTHER PUBLICATIONS

First Office Action of the Chinese application No. 201910622345.3, dated Nov. 3, 2020.
International Search Report in the international application No. PCT/CN2020/087444, dated Jul. 24, 2020.
Partial European Search Report in the European application No. 20172983.7, dated Jul. 17, 2020.
Written Opinion of the International Search Authority in the international application No. PCT/CN2020/087444, dated Jul. 24, 2020.
First Office Action of the Europe application No. 20172983.7, dated Apr. 30, 2021.
Office Action of the Indian application No. 202024026711, dated Jul. 8, 2021.
Oral Office Action of the European application No. 20172983.7, dated Sep. 27, 2021.

\* cited by examiner

ELECTRONIC DEVICE AND METHOD FOR CONTROLLING DECORATIVE MEMBER LENS

CROSS-REFERENCE TO RELATED APPLICATIONS

This application is based upon and claims priority to Chinese patent application No. 201910622345.3, filed on Jun. 28, 2019, the entire contents of which are incorporated herein by reference.

TECHNICAL FIELD

The disclosure relates to the technical field of electronics, and more particularly, to an electronic device and a method for controlling a decorative member lens.

BACKGROUND

With the development of a communication technology, an electronic device such as a smart phone and the like is becoming more and more popular. In the daily use of the electronic device, a shooting function of the electronic device is becoming more and more important, and requirements for a shooting effect are becoming higher and higher.

In the related art, in order to provide an electronic device with a better holding effect, efforts have been made to reduce the thickness of the electronic device. Meanwhile, in order to obtain a better shooting effect, a more powerful camera component is needed. The more powerful camera component has a larger size. In order to accommodate the more powerful camera component, the electronic device needs to be thicker. It is not conducive to reducing the thickness of the electronic device.

SUMMARY

An embodiment of the disclosure provides an electronic device. The electronic device includes: a camera component, a decorative member, a decorative member lens and a driving mechanism.

The camera component includes a motor and a lens, and the motor is configured to drive the lens to move.

The decorative member is provided relative to the camera component.

The decorative member lens is mounted on the decorative member, and the decorative member lens is spaced from the lens.

The driving mechanism is coupled to the decorative member lens, and the driving mechanism is configured to drive the decorative member lens to move away from or towards the lens.

An embodiment of the disclosure also provides a method for controlling a decorative member lens. The method may be applied to an electronic device. The electronic device may include a camera component, a decorative member and a decorative member lens. The camera component may include a motor and a lens. The motor may be configured to drive the lens to move. The decorative member may be provided relative to the camera component. The decorative member lens may be mounted on the decorative member. The decorative member lens may be spaced from the lens. The method includes operations as follows.

An operating state of the camera component is detected in real time.

The decorative member lens is driven to move away from the lens in response to detecting that the camera component is switched into the operating state.

The decorative member lens is driven to move towards the lens in response to detecting that the operating state of the camera component ends.

An embodiment of the disclosure also provides a non-transitory computer-readable storage medium having stored therein instructions that, when executed by a processor of an electronic device, causes the electronic device to perform the above method for controlling a decorative member lens.

BRIEF DESCRIPTION OF THE DRAWINGS

In order to more clearly illustrate the technical solutions in embodiments of the disclosure, the accompanying drawings used in the description of the embodiments will be briefly introduced below.

DETAILED DESCRIPTION

The technical solutions in the embodiments of the application will be described below in combination with the drawings in the embodiments of the application. It is apparent that the described embodiments are only part of the embodiments of the disclosure, not all of the embodiments. All other embodiments obtained by those skilled in the art based on the embodiments in the disclosure without creative efforts fall within the scope of protection of the disclosure.

The embodiments of the disclosure provide an electronic device and a processing method thereof. The electronic device may be a device such as a smart phone, a tablet computer, or a game device, an Augmented Reality (AR) device, a data storage device, an audio playing device, a video playing device, a wearable device, etc. The wearable device may be a smart bracelet, smart glasses, etc.

Figure 1:
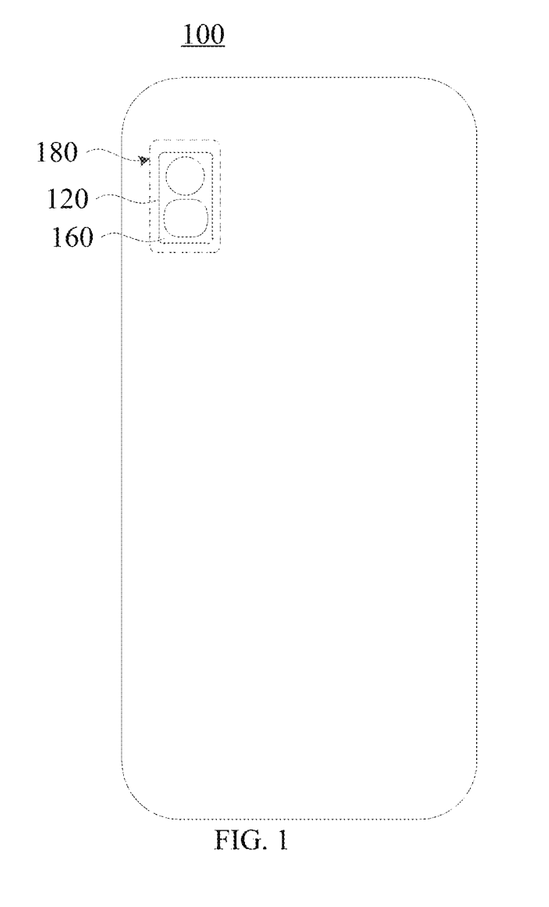
FIG. 1 illustrates a first structure diagram illustrating an electronic device according to an embodiment of the disclosure.
Figure 2:
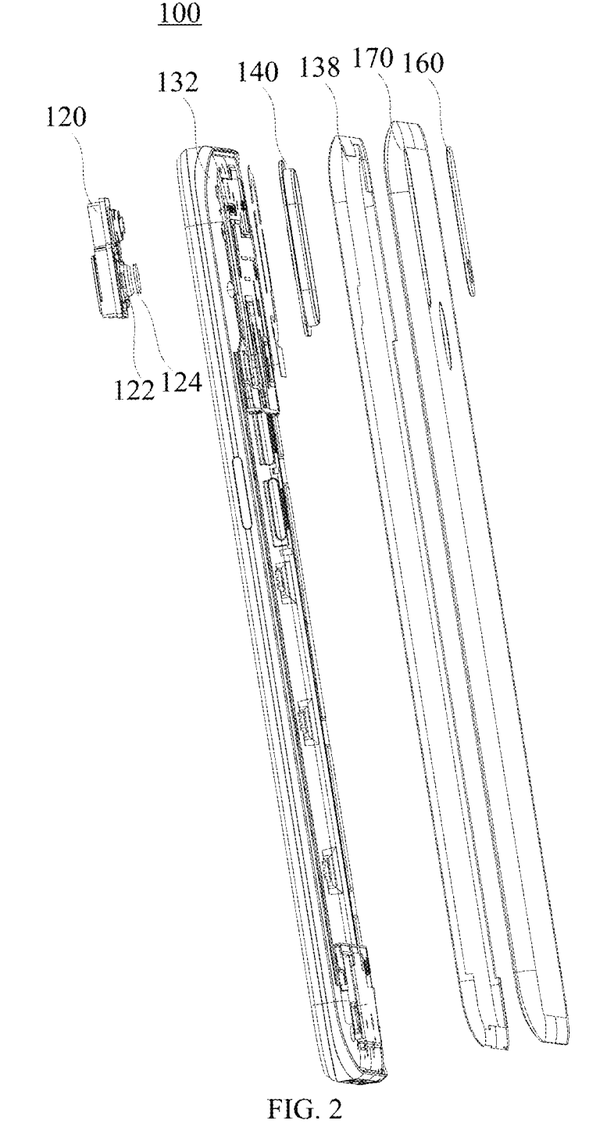
FIG. 2 illustrates a partially exploded diagram of an electronic device according to an embodiment of the disclosure.

Referring to FIG. 1 and FIG. 2, FIG. 1 illustrates a first structure diagram illustrating an electronic device according to an embodiment of the disclosure, and FIG. 2 illustrates a partially exploded diagram of an electronic device according to an embodiment of the disclosure. The electronic device 100 includes a camera component 120, a decorative member 140, a decorative member lens 160 and a driving mechanism 180.

The camera component 120 includes a motor 122 and a lens 124. The motor 122 is configured to drive the lens 124 to move. The motor 122 can drive the lens 124 to move so as to perform a focus operation.

The decorative member 140 is provided relative to the camera component 120. The decorative member lens 160 is mounted on the decorative member 140. The decorative member lens 160 is spaced from the lens 124. The driving mechanism 180 is coupled to the decorative member lens 160. The driving mechanism 180 is configured to drive the decorative member lens 160 to move away from or towards the lens 124.

The driving mechanism 180 can drive the decorative member lens 160 to move away from the lens 124, so that a distance between the decorative member lens 160 and the lens 124 is increased, and the motor 122 in/of the camera component 120 can drive the lens 124 to move in a larger space. Therefore, the lens 124 moves in a larger space, thereby obtaining a better shooting effect without increasing the thickness of the electronic device 100. When the lens 124 is no longer required to be driven by the motor 122 after the shooting is completed, the driving mechanism 180 drives the decorative member lens 160 to move towards the lens 124.

The operation that the driving mechanism 180 drives the decorative member lens 160 to move away from or towards the lens 124 can also be understood that the driving mechanism 180 drives the decorative member lens 160 to move in a direction perpendicular to an acquisition surface of the lens 124 acquiring an optical signal, or the driving mechanism 180 drives the decorative member lens 160 to move in a thickness direction of the electronic device 100.

Figure 3:
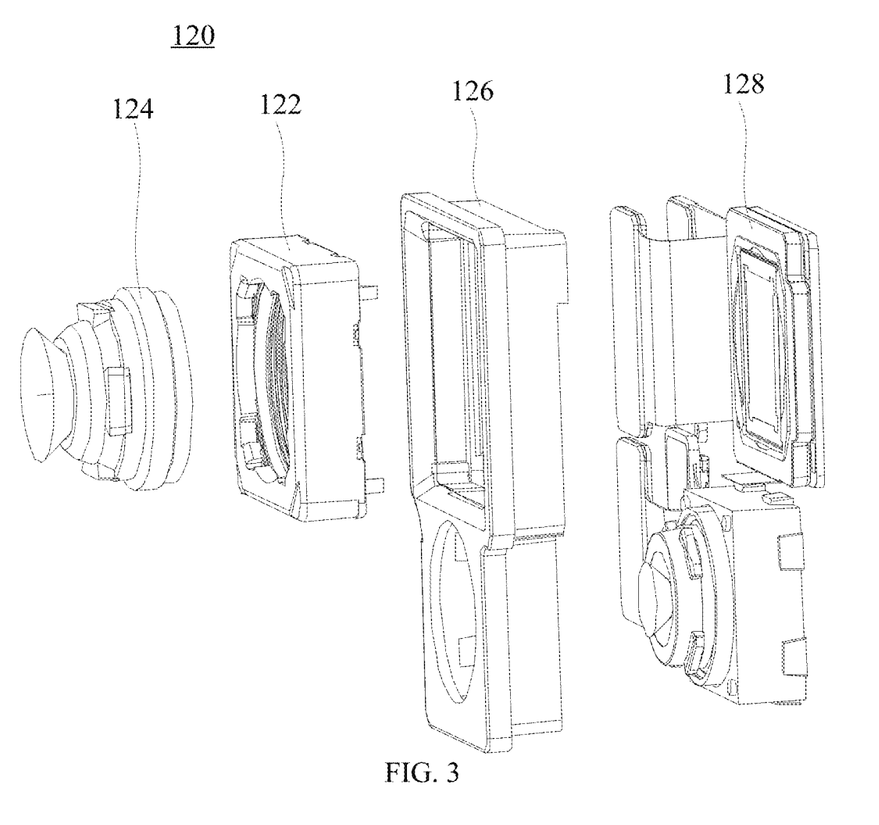
FIG. 3 illustrates a structure diagram illustrating a camera component in an electronic device according to an embodiment of the disclosure.

A specific structure of the camera component 120 can be referred to FIG. 3. The camera component 120 can include a lens 124, a motor 122, a component housing 126, and a substrate 128. The component housing 126 is provided on the substrate 128. The motor 122 is provided in the component housing 126. The motor 122 is provided with a driving space. The lens 124 is provided in the driving space of the motor 122. It is to be noted that the structure of the above camera component 120 is merely an example. The camera component 120 can also adopt other structures.

The driving mechanism 180 is configured to drive the decorative member lens 160 to move away from the lens 124 in response to an operation of the camera component 120. The driving mechanism 180 is configured to drive the decorative member lens 160 to move towards the lens 124 in response to the end of the operation of the camera component 120.

Figure 4:
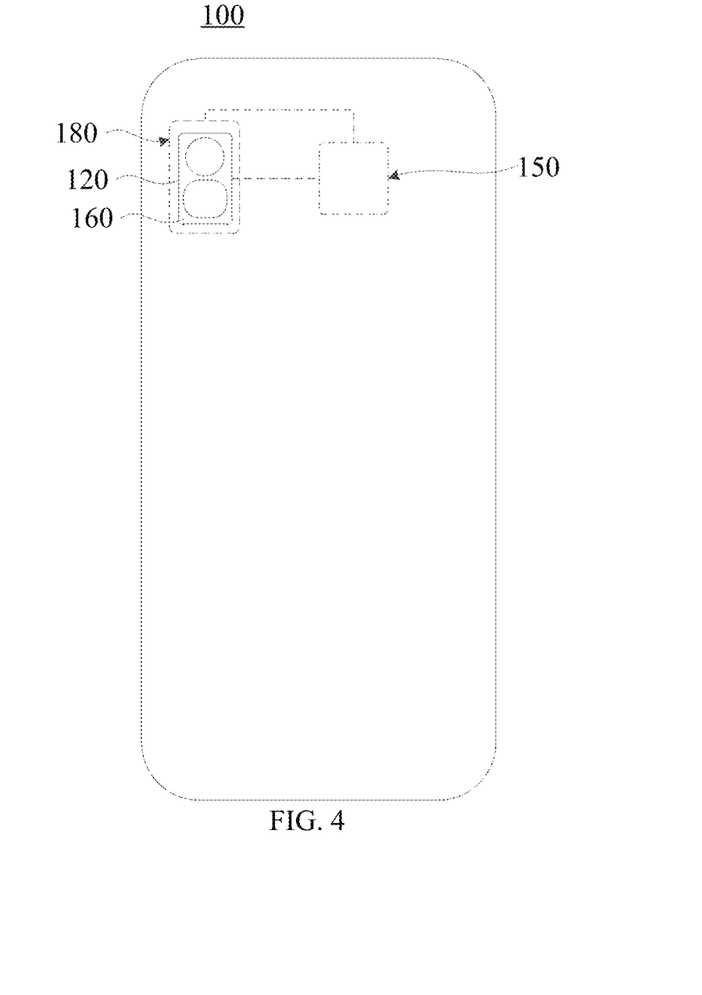
FIG. 4 illustrates a second structure diagram illustrating an electronic device according to an embodiment of the disclosure.

Specifically, with reference to FIG. 4, the electronic device 100 can further include a processor 150. The processor 150 is configured to detect a state of the camera component 120. When the processor 150 detects the operation of the camera component 120, the processor 150 controls the driving mechanism 180 to drive the decorative member lens 160 to move away from the lens 124. When the processor 150 detects the end of the operation of the camera component 120, the processor 150 controls the driving mechanism 180 to drive the decorative member lens 160 to move towards the lens 124. When the camera component 120 does not operate/work, the decorative member lens 160 is located closest to the interior of the electronic device 100. When the camera component 120 operates or before the camera component 120 operates, the processor 150 controls the driving mechanism 180 to drive the decorative member lens 160 to move away from the lens 124, so as to increase a distance between the lens 124 and the decorative member lens 160, which facilitates the motor 122 to control the lens 124 to move. After the end of the operation of the camera component 120, the processor 150 controls the driving mechanism 180 to drive the decorative member lens 160 to move towards the lens 124. The decorative member lens 160 is located closest to the interior of the electronic device 100 again.

The electronic device 100 can further include a back cover 170. The back cover 170 has a lens hole 172. The decorative member lens 160 is mounted in the lens hole 172.

The driving mechanism 180 is configured to drive the decorative member lens 160 to move between a first position and a second position. When the decorative member lens 160 is in the first position, an outer surface of the decorative member lens 160 is flush with an outer surface of the back cover 170. When the decorative member lens 160 is in the second position, the outer surface of the decorative member lens 160 protrudes from the outer surface of the back cover 170.

It can be understood that, when the decorative member lens 160 is in the first position, the outer surface of the decorative member lens 160 is flush with the outer surface of the back cover 170. The decorative member lens 160 does not protrude from the back cover 170. The back cover 170 of the electronic device 100 is flat and convenient to be held. There is no bump and foreign body sensation when being held. When the decorative member lens 160 is in the second position, the decorative member lens 160 protrudes from the outer surface of the back cover 170, so that the distance between the decorative member lens 160 and the lens 124 is increased, it is convenient for the motor 122 to control the lens 124 to move so as to perform a focus operation, and the quality of an image obtained by the camera component 120 is improved.

In the descriptions of the disclosure, it is to be understood that terms "first", "second" and the like are only adopted to distinguish similar objects and should not be understood as indicating or implying relative importance or implicitly indicating the number of indicated technical features.

The motor 122 drives the lens 124 to move. The lens 124 can be enabled to move between a third position and a fourth position. It can also be understood that a maximum motion distance of the lens 124 is a distance between the third position and the fourth position. The fourth position is located between the third position and the second position. It can also be understood that the third position is farthest from the back cover 170, the fourth position is between the third position and the back cover 170, and the back cover 170, the fourth position and the third position are provided/ set in sequence. The first position can be located inside the back cover 170 or in the lens hole 172 of the back cover 170. The second position can be located outside the back cover 170. When the lens 124 is in the fourth position, an outer surface of the lens 124 (can also be understood as an outer surface away from the interior of the electronic device 100) for acquiring an image can be located between the first position and the second position or reach the first position. That is, the outer surface of the lens 124 extends beyond the back cover 170 or is located in the lens hole 172 of the back cover 170. Of course, when the lens 124 is in the fourth position, the outer surface of the lens 124 can be located on a side of the first position facing the interior of the electronic device 100. That is, the outer surface of the lens 124 is also located in the electronic device 100.

There is a second distance between the third position and the fourth position. The second distance can be understood as a maximum moving distance of the lens 124. When the lens 124 is in the third position, the distance between the lens 124 and the decorative member lens 160 is less than or equal to the second distance. The distance between the lens 124 and the decorative member lens 160 can be understood as a distance between an upper surface of the lens 124 facing the decorative member lens 160 and a lower surface of the decorative member lens 160 facing the lens 124. The distance between the lens 124 and the decorative member lens 160 can be less than or equal to the second distance. Thus, when the camera component 120 does not operate, the distance between the lens 124 and the decorative member lens 160 can be very small, and the distance between the lens 124 and the decorative member lens 160 can be set as only a safety clearance. When the camera component 120 needs to operate, the decorative member lens 160 is moved outwards, so that the distance between the decorative member lens 160 and the lens 124 is increased, so as to provide a sufficient moving space for the lens 124. The moving distance of the decorative member lens 160 is greater than or equal to the second distance.

In the related art, when the lens is located in the electronic device, the lens can move by a motion distance D1. There is a safety clearance D2 between the lens and the decorative member lens. That is, the lens and the decorative member lens need at least the motion distance D1 plus the safety clearance D2. In the embodiments of the disclosure, the decorative member lens 160 is movable. The decorative member lens 160 can move by a moving distance D3 relative to the lens 124. If the moving distance D3 is greater than or equal to the motion distance D1, when the decorative member lens 160 is in the first position, the distance between the decorative member lens 160 and the lens 124 only needs the safety clearance D2, so that the electronic device 100 can not only be provided with a high-performance camera component 120, but also not affect the overall thickness of the electronic device 100. When the camera component 120 is not used, the decorative member lens 160 cannot protrude from the back cover 170 of the electronic device 100.

If the moving distance D3 is less than the motion distance D1, when the decorative member lens 160 is in the first position, the distance between the decorative member lens 160 and the lens 124 is required to be the safety clearance D2 plus a difference (D1-D3) between the motion distance D1 and the moving distance D3.

Figure 5:
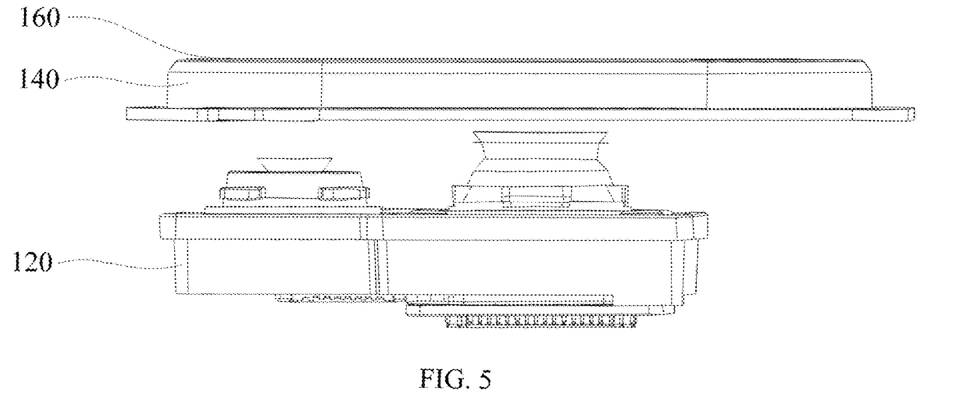
FIG. 5 illustrates a first structure diagram illustrating a camera component and a decorative member lens in an electronic device according to an embodiment of the disclosure.
Figure 6:
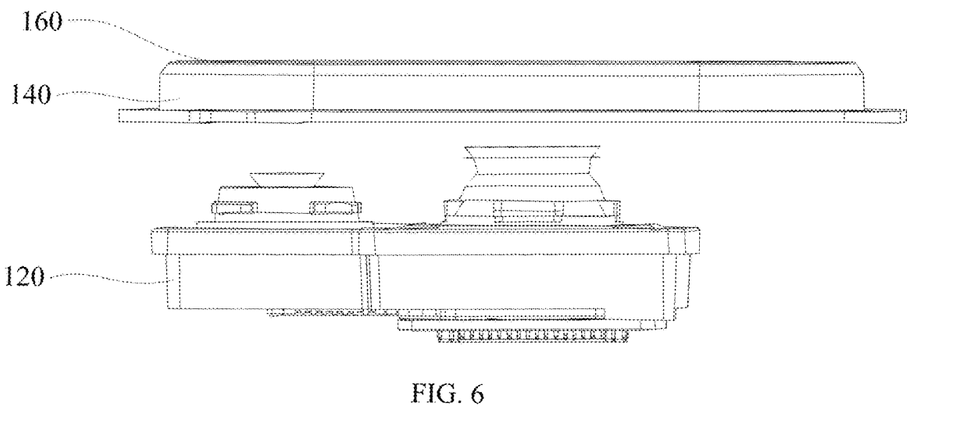
FIG. 6 illustrates a second structure diagram illustrating a camera component and a decorative member lens in an electronic device according to an embodiment of the disclosure.

Exemplarily, the relative positions of the camera component 120 and the decorative member lens 160 can be changed. Specifically, referring to FIG. 5 and FIG. 6, FIG. 5 illustrates a first structure diagram illustrating a camera component and a decorative member lens in an electronic device according to an embodiment of the disclosure, and FIG. 6 illustrates a second structure diagram illustrating a camera component and a decorative member lens in an electronic device according to an embodiment of the disclosure. As illustrated in FIG. 5, the distance between the lens 124 of the camera component and the decorative member lens 160 is X1. The lens 124 is located closest to the substrate. As illustrated in FIG. 6, after the driving mechanism drives the decorative member lens 160 to move away from the lens 124, the distance between the lens 124 of the camera component 120 and the decorative member lens 160 is X2. The lens 124 is located closest to the substrate. The distance X2 is greater than the distance X1, thereby providing a greater moving space for the lens 124. The distance X1 can be less than or equal to the maximum motion distance of the lens 124. The distance X1 can also be greater than the maximum motion distance of the lens 124. It is to be noted that, as illustrated in the figure, the decorative member 140 and the decorative member lens 160 move together. In some other embodiments, the decorative member 140 can be stationary, and the decorative member lens 160 can move.

Figure 7:
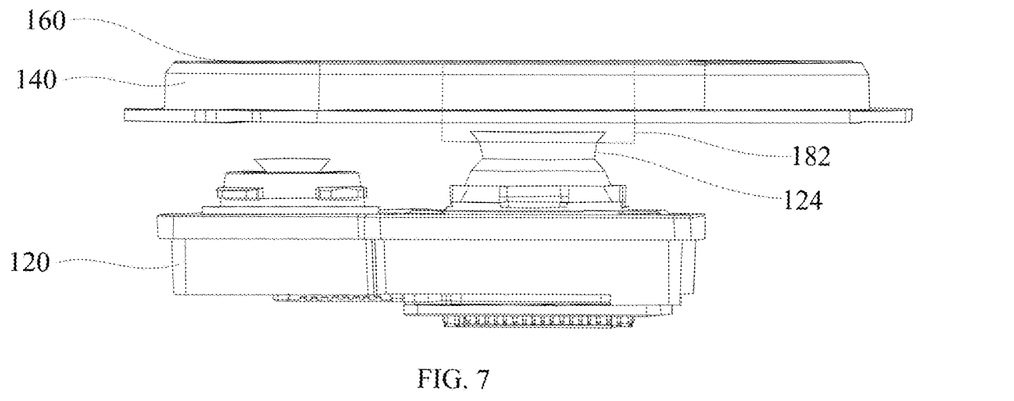
FIG. 7 illustrates a third structure diagram illustrating a camera component and a decorative member lens in an electronic device according to an embodiment of the disclosure.

Referring to FIG. 7, FIG. 7 illustrates a third structure diagram illustrating a camera component and a decorative member lens in an electronic device according to an embodiment of the disclosure. The driving mechanism 180 can include a connecting member 182. The lens 124 is fixedly coupled to the decorative member lens 160 through the connecting member 182. The connecting member 182 is configured to drive the decorative member lens 160 to move when the lens 124 moves. The decorative member lens 160 and the lens 124 are fixedly coupled through the connecting member 182. The decorative member lens 160 is naturally driven to move due to the movement of the lens 124. The distance between the decorative member lens 160 and the lens 124 is a fixed value, such as a safety clearance, so that the electronic device 100 can not only be provided with a high-performance camera component 120, but also not affect the overall thickness of the electronic device 100. When the camera component 120 is not used, the decorative member lens 160 cannot protrude from the back cover 170 of the electronic device 100. The decorative member lens 160 can be coupled to an end of the lens 124 facing the decorative member lens 160 through the connecting member 182, or the decorative member lens 160 can be coupled to other positions of the lens 124 through the connecting member 182.

The lens 124 is fixedly coupled to the decorative member lens 160 through the connecting member 182. It is not necessary to design complicated logic to control the lens 124 and the decorative member lens 160 to move respectively. There is no need to worry about the problem that the lens 124 hits the decorative member lens 160.

The lens 124 can move separately or with other components (such as a coil). The coil and the lens 124 in the camera component 120 are driven together. The coil can be coupled to the decorative member lens 160 through the connecting member 182, so that when the lens 124 moves, the coil, the connecting member 182 and the decorative member lens 160 move together.

The decorative member lens 160 and the decorative member 140 can be of separate structures. That is, the driving mechanism 180 can drive the decorative member lens 160 to move relative to the decorative member 140. The decorative member lens 160 and the decorative member 140 can also be fixedly coupled. The decorative member lens 160 and the decorative member 140 move together. The operation that the driving mechanism 180 drives the decorative member lens 160 to move can refer to that the decorative member lens 160 is driven to move when the driving mechanism 180 drives the decorative member 140 to move.

Figure 8:
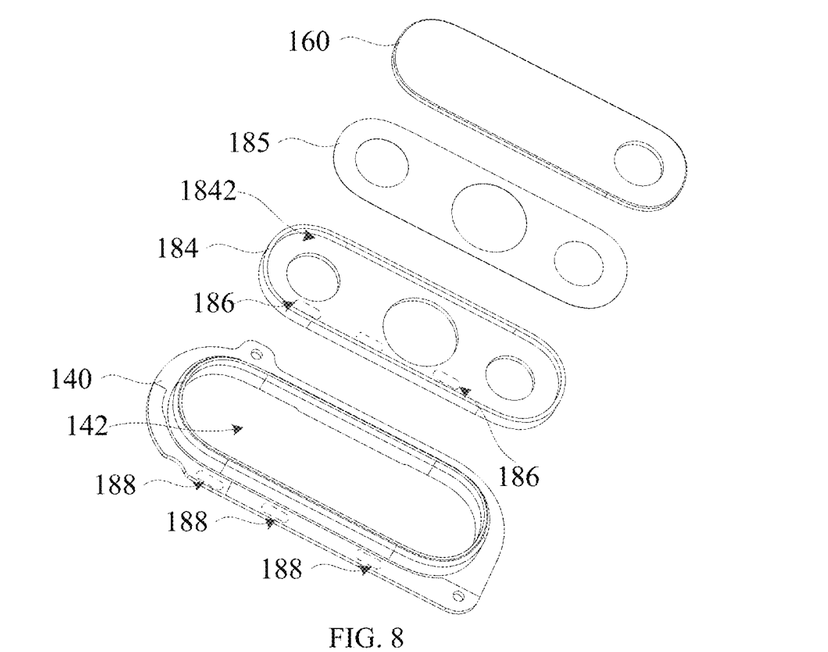
FIG. 8 illustrates a fourth structure diagram illustrating a camera component and a decorative member lens in an electronic device according to an embodiment of the disclosure.

The lens 124 and the decorative member lens 160 can be driven separately. Specifically, referring to FIG. 8, FIG. 8 illustrates a fourth structure diagram illustrating a camera component and a decorative member lens in an electronic device according to an embodiment of the disclosure. The driving mechanism 180 for driving the decorative member lens 160 can further include a lifting member 184. The decorative member 140 has a through hole 142. The lifting member 184 is provided in the through hole 142. The lifting member 184 has a groove 1842. The decorative member lens 160 is mounted in the groove 1842. The driving mechanism 180 is configured to drive the lifting member 184 to move so as to drive the decorative member lens 160 to move.

The decorative member lens 160 and the lifting member 184 can be fixedly coupled. The decorative member lens 160 and the lifting member 184 can be fixedly coupled by a double-sided adhesive 185, and can also be fixedly coupled by means of clamping fixing, glue fixed connection, two-color integral injection molding, and the like.

The driving mechanism 180 can adopt various modes such as magnetic driving, motor driving or spring driving.

Exemplarily, the driving mechanism 180 can include a permanent magnet 186 and an electromagnet 188 provided in cooperation with each other. The permanent magnet 186 is provided on the lifting member 184. The electromagnet 188 is provided on the decorative member 140. The electromagnet 188 is configured to drive the permanent magnet 186 to move according to a magnetic change thereof, and drive the lifting member 184 and the decorative member lens 160 to move.

The magnetism of the electromagnet 188 can be controlled to drive the permanent magnet 186 to move. For example, when the camera component 120 does not operate, the magnetism of the electromagnet 188 is controlled to be opposite to the magnetism of the permanent magnet 186. The lifting member 184 and the decorative member lens 160 are fixed in the first position by using a suction force generated by the attraction of the two opposites. When the camera component 120 operates or is ready to operate, the magnetism of the electromagnet 188 is controlled to be the same as the magnetism of the permanent magnet 186. The lifting member 184 and the decorative member lens 160 are pushed out by using a pushing force generated by the repulsion of the same magnetism, and are stabilized in the second position. After the end of the operation of the camera component 120, the magnetism of the electromagnet 188 is controlled to be opposite to the magnetism of the permanent magnet 186. The lifting member 184 and the decorative member lens 160 are retracted and stabilized in the first position by using a suction force generated by the attraction of the two opposites.

A limiting structure can be added to stabilize the decorative member lens 160 in the first position and the second position. For example, the decorative member 140 is provided with a first groove corresponding to the first position and a second groove corresponding to the second position. A limiting electromagnet is provided in each of the grooves. The lifting member 184 is provided with retractable metal balls corresponding to the two grooves. An edge of the lifting member 184 is provided with a receiving hole in which the metal ball is provided. The metal ball can be completely provided in the receiving hole. When the lifting member and the decorative member lens 160 are in the first position, the limiting electromagnet in the first groove is energized/powered on to generate a magnetic force, and the metal ball is clamped in the first groove. One end of the metal ball is located in the first groove while the other end is located in the receiving hole, thereby stabilizing the lifting member and the decorative member lens 160 in the first position. When the lifting member and the decorative member lens 160 are in the second position, the limiting electromagnet in the second groove is energized to generate a magnetic force, and the metal ball is clamped in the second groove. One end of the metal ball is located in the second groove while the other end is located in the receiving hole, thereby stabilizing the lifting member and the decorative member lens 160 in the second position. When limiting is not required, the limiting electromagnet is not energized, the metal ball enters the receiving hole, and the motion of the lifting member 184 is not affected.

Figure 9:
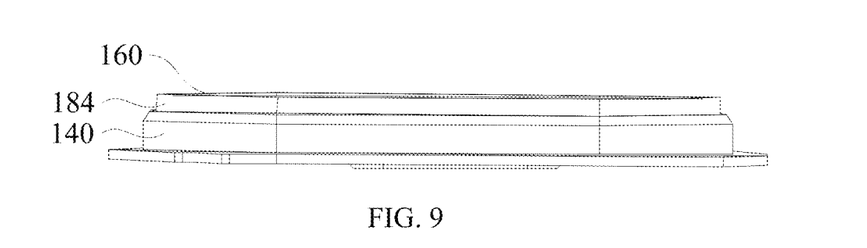
FIG. 9 illustrates a first structure diagram illustrating a decorative member and a decorative member lens in an electronic device according to an embodiment of the disclosure.
Figure 10:
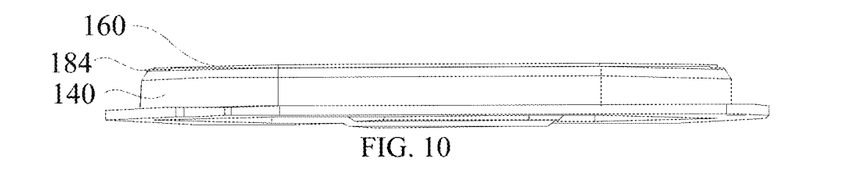
FIG. 10 illustrates a second structure diagram illustrating a decorative member and a decorative member lens in an electronic device according to an embodiment of the disclosure.

Exemplarily, the relative positions of the decorative member 140 and the decorative member lens 160 can be changed. Specifically, referring to FIG. 9 and FIG. 10, FIG. 9 illustrates a first structure diagram illustrating a decorative member and a decorative member lens in an electronic device according to an embodiment of the disclosure, and FIG. 10 illustrates a second structure diagram illustrating a decorative member and a decorative member lens in an electronic device according to an embodiment of the disclosure. As illustrated in FIG. 9, the decorative member lens 160 and the lifting member 184 are located in the through hole 142 of the decorative member 140. The lifting member 184 and the decorative member lens 160 can be entirely located in the through hole 142. The lifting member 184 can move away from the lens in the through hole 142. As illustrated in FIG. 10, the lifting member 184 can partially protrude from the through hole 142, and the decorative member lens 160 also moves from the inside of the through hole 142 to the outside of the through hole 142.

The processor 150 can be further configured to control, in response to the drop/fall of the electronic device 100, the driving mechanism 180 to drive the decorative member lens 160 to move away from the lens 124. When moving in the electronic device 100, the lens 124 can be pulled by a reed, just like a rubber band. In the case of drop or the like, the lens 124 will move upwards due to inertia and easily hit the decorative member lens 160. Therefore, in response to the drop of the electronic device 100, the driving mechanism 180 is controlled to drive the decorative member lens 160 to move away from the lens 124, so that the distance between the decorative member lens 160 and the lens 124 is increased. The increased distance is greater than the motion distance of the lens 124. The lens 124 is prevented from hitting the decorative member lens 160 due to inertial movement. Whether the electronic device is in a dropping state can be identified through a functional device such as a gravity sensor and the like.

In the embodiments of the disclosure, the decorative member lens can further include a flashlight hole. A flashlight cooperating with the camera component can be provided in correspondence to the flashlight hole. In the presence of a plurality of camera components, the flashlight hole can be provided between two camera components, or can be provided on one side of all the camera components.

It is to be noted that two camera components such as a main camera component and an auxiliary camera component can be included in the camera component of the embodiments of the disclosure. The pixel vale of the main camera component is greater than that of the auxiliary camera component. For example, the pixel value of the main camera component is about 48 million, and the pixel value of the auxiliary camera component is about 18 million. Four camera components can also be included in the camera component. The four camera components can be arranged in a row or a column, or can be arranged in a matrix. The four camera components can be a main camera component, a wide-angle camera component, a blur camera component, and a close-range camera component.

Figure 11:
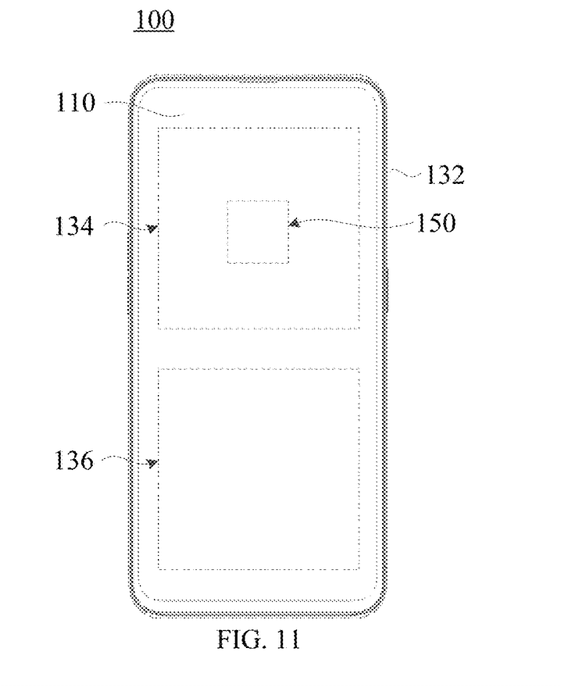
FIG. 11 illustrates a third structure diagram illustrating an electronic device according to an embodiment of the disclosure.

Referring to FIG. 11 and FIG. 2, FIG. 11 illustrates a third structure diagram illustrating an electronic device according to an embodiment of the disclosure. The electronic device 100 can further include a display screen 110, a middle frame 132, a circuit board 134, and a battery 136.

The display screen 110 can be mounted on the middle frame 132 and coupled to the back cover 170 through the middle frame 132. The display screen 110 can form a display surface of the electronic device 100 for displaying information such as images, text and the like. The display screen 110 can include a Liquid Crystal Display (LCD) or an Organic Light-Emitting Diode (OLED).

It can be understood that a cover plate can be further provided on the display screen 110. The cover plate covers the display screen 110 to protect the display screen 110 and prevent the display screen 110 from being scratched or damaged by water. The cover plate can be a transparent glass cover plate, so that a user can observe the information displayed on the display screen 110 through the cover plate. For example, the cover plate can be a glass cover plate made of sapphire.

The middle frame 132 can have a thin plate-like or sheet-like structure, or can have a hollow frame structure. The middle frame 132 is configured to provide support for electronic components or functional components in the electronic device 100 to mount the electronic components and the functional components in the electronic device 100 together.

The middle frame 132 and the back cover 170 can collectively form a housing of the electronic device 100 and are configured to receive or mount the electronic components, the functional components, and the like of the electronic device 100. In addition, the functional components such as a camera, a receiver, the circuit board, the battery and the like of the electronic device 100 can be mounted on the middle frame 132 or the circuit board 134 for fixing. It can be understood that the material of the middle frame 132 can include metal or plastic.

The circuit board 134 can be mounted on the middle frame 132. The circuit board 134 can be a main board of the electronic device 100. One or more of the functional components such as a microphone, a speaker, a receiver, a headphone interface, a camera, an acceleration sensor, a gyroscope, a processor 150 and the like can be integrated on the circuit board 134. Meanwhile, the display screen 110 can be electrically coupled to the circuit board 134 to control the display of the display screen 110 by the processor 150 on the circuit board 134.

The battery 136 can be mounted on the middle frame 132. Meanwhile, the battery 136 is electrically coupled to the circuit board 134, so that the battery 136 supplies power to the electronic device 100. The circuit board 134 can be provided with a power management circuit. The power management circuit is configured to distribute voltage provided by the battery 136 to various electronic components in the electronic device 100.

The back cover 170 can be integrally formed. During the forming process of the back cover 170, a structure such as a rear lens hole 172 can be formed on the back cover 170, and the lens hole 172 is directly facing the camera component 120. The back cover 170 can be fixedly coupled to the middle frame 132 through double-sided gum 138.

In some embodiments, the moving distance of the decorative member lens is limited, the lens has a larger motion distance, and the motion distance of the lens is greater than the moving distance of the decorative member lens. In order to prevent the decorative member lens from protruding from the back cover and also to better reduce the thickness of the electronic device, a notch can be provided at a position of the circuit board corresponding to the lens, and other parts of the camera component are provided on the circuit board, so that the motion distance of the lens can be increased. A plurality of camera components with different functions, such as at least two of a main camera component, a long-focal camera component, a depth-of-field camera component, a macro camera component, a Time of Flight (TOF) camera component, or a blur camera component, can be provided. The heights of different camera components are different, and the lens motion distances of different camera components are also different. Therefore, in combination with the height and the lens motion distance of the camera component, the camera component having a larger sum of the height and the lens motion distance is provided in the notch of the circuit board. Since the camera component having a larger sum of the height and the lens motion distance is provided on the circuit board, the total height required by the camera component is reduced. The circuit board includes a first surface and a second surface opposite to each other. The first surface faces the decorative member lens. In order not to affect the assembly and other components of the second surface of the circuit board, a side of the camera component provided in the notch of the circuit board away from the lens cannot extend beyond the second surface of the circuit board.

In order to further describe a mutual relation between the camera component and the decorative member lens in embodiments of the disclosure, the following is defined from the perspective of the method for controlling a decorative member lens.

Figure 12:
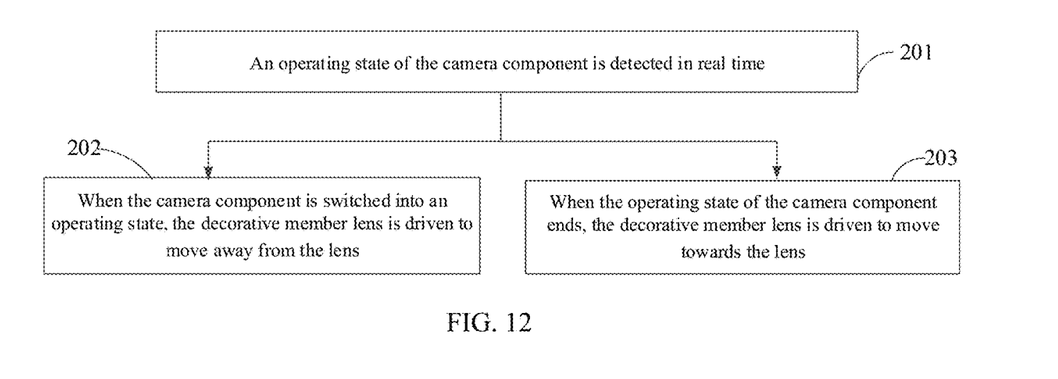
FIG. 12 illustrates a flow chart showing a method for controlling a decorative member lens according to an embodiment of the disclosure.

Referring to FIG. 12, FIG. 12 illustrates a flow chart showing a method for controlling a decorative member lens according to an embodiment of the disclosure. The method for controlling a decorative member lens is applied to an electronic device. The electronic device can be any electronic device in the foregoing embodiments. Exemplarily, the electronic device includes a camera component, a decorative member and a decorative member lens. The camera component includes a motor and a lens. The motor is configured to drive the lens to move. The camera component and the decorative member lens are both mounted on the decorative member. The decorative member lens is spaced from the lens. The method for controlling a decorative member lens can specifically include operations as follows.

At 201, an operating state of the camera component is detected in real time.

At 202, when the camera component is switched to/into an operating state, the decorative member lens is driven to move away from the lens.

At 203, when the operating state of the camera component ends, the decorative member lens is driven to move towards the lens.

The driving mechanism can drive the decorative member lens to move away from the lens, so that a distance between the decorative member lens and the lens is increased, and the motor in the camera component can drive the lens to move in a larger space. Therefore, the lens moves in a larger space, thereby obtaining a better shooting effect without increasing the thickness of the electronic device. When the lens is no longer required to be driven by the motor after the shooting is completed, the driving mechanism drives the decorative member lens to move towards the lens.

When the camera component does not operate, the decorative member lens is located closest to the interior of the electronic device. When the camera component operates or before the camera component operates, the driving mechanism is controlled to drive the decorative member lens to move away from the lens to increase a distance between the lens and the decorative member lens, which facilitates the motor to control the lens to move. After the end of the operation of the camera component, the driving mechanism is controlled to drive the decorative member lens to move towards the lens. The decorative member lens is located closest to the interior of the electronic device again.

In some embodiments, the method for controlling a decorative member lens can further include: the decorative member lens is driven to move away from the lens in response to the drop of the electronic device.

When moving in the electronic device, the lens can be pulled by a reed, just like a rubber band. In the case of drop or the like, the lens will move upwards due to inertia and easily hit the decorative member lens. Therefore, in response to the drop of the electronic device, the driving mechanism is controlled to drive the decorative member lens to move away from the lens, so that the distance between the decorative member lens and the lens is increased. The increased distance is greater than the motion distance of the lens. The lens is prevented from hitting the decorative member lens due to inertial movement. Whether the electronic device is in a dropping state can be identified through a functional device such as a gravity sensor and the like.

An embodiment of the disclosure further provides a storage medium. A computer program is stored in the storage medium. When the computer program is executed by a computer, the computer performs the method for controlling a decorative member lens according to any one of the foregoing embodiments.

It is to be noted that those of ordinary skill in the art may understand that all or part of the operations in the various methods of the foregoing embodiments may be completed by using a computer program to instruct related hardware. The computer program may be stored in a computer-readable storage medium. The storage medium may include, but is not limited to, a Read Only Memory (ROM), a Random Access Memory (RAM), a magnetic disk or an optical disk.

The electronic device and the method for controlling a decorative member lens provided in the embodiments of the disclosure have been described in detail above. The principle and implementation manner of the disclosure are elaborated in the specification with specific examples. The embodiments are described above only to help the disclosure to be understood. Meanwhile, those skilled in the art may make variations to the specific implementation manner and the scope of application according to the idea of the disclosure. Based on the foregoing, the content of the specification should not be understood as a limitation on the disclosure.

The invention claimed is:

1. An electronic device, comprising:
   a camera component comprising a motor and a lens, the motor being configured to drive the lens to move;
   a decorative member provided relative to the camera component;
   a decorative member lens mounted on the decorative member, the decorative member lens being spaced from the lens; and
   a driving mechanism coupled to the decorative member lens, the driving mechanism being configured to drive the decorative member lens to move away from or towards the lens;
   wherein the driving mechanism is configured to drive the decorative member lens to move away from the lens in response to an operation of the camera component;
   the driving mechanism is configured to drive the decorative member lens to move towards the lens in response to an end of the operation of the camera component; and
   the driving mechanism is configured to drive the decorative member lens to move away from the lens in response to a fall of the electronic device.

2. The electronic device of claim 1, further comprising: a back cover, the back cover comprising a lens hole, the decorative member lens being mounted in the lens hole; and
   wherein the driving mechanism is configured to drive the decorative member lens to move between a first position and a second position, an outer surface of the decorative member lens is flush with an outer surface of the back cover in response to the decorative member lens being in the first position, and the outer surface of the decorative member lens protrudes from the outer surface of the back cover in response to the decorative member lens being in the second position.

3. The electronic device of claim 2, wherein the motor is configured to drive the lens to move between a third position and a fourth position, and the fourth position is located between the third position and the second position; and
   wherein a second distance is provided between the third position and the fourth position, and a distance between the lens and the decorative member lens is less than or equal to the second distance in response to the lens being in the third position.

4. The electronic device of claim 1, wherein the driving mechanism comprises a connecting member, the lens is fixedly coupled to the decorative member lens through the connecting member, and the connecting member is configured to drive the decorative member lens to move in response to a movement of the lens.

5. The electronic device of claim 1, wherein the decorative member lens is fixedly coupled to the decorative member, and the decorative member lens is driven to move in response to the driving mechanism driving the decorative member to move.

6. The electronic device of claim 1, wherein the driving mechanism comprises a lifting member, the decorative member comprises a through hole, the lifting member is provided in the through hole, the lifting member comprises a groove, the decorative member lens is mounted in the groove, and the decorative member lens is driven to move in response to the driving mechanism driving the lifting member to move.

7. The electronic device of claim 6, wherein the driving mechanism further comprises a permanent magnet and an electromagnet provided in cooperation with each other;
   wherein the permanent magnet is provided on the lifting member, the electromagnet is provided on the decorative member, the electromagnet is configured to drive the permanent magnet to move according to a magnetic change thereof, and the lifting member and the decorative member lens are driven to move.

8. A method for controlling a decorative member lens, applied to an electronic device, wherein the electronic device comprises a camera component, a decorative member and a decorative member lens, the camera component comprises a motor and a lens, the motor is configured to drive the lens to move, the decorative member is provided relative to the camera component, the decorative member lens is mounted on the decorative member, and the decorative member lens is spaced from the lens, the method comprising:

detecting an operating state of the camera component in real time;

driving the decorative member lens to move away from the lens in response to detecting that the camera component is switched into the operating state;

driving the decorative member lens to move towards the lens in response to detecting that the operating state of the camera component ends; and     driving the decorative member lens to move away from the lens in response to a fall of the electronic device.

9. The method for controlling a decorative member lens of claim 8, wherein the driving mechanism comprises a connecting member, the lens is fixedly coupled to the decorative member lens through the connecting member;

wherein the driving the decorative member lens to move comprises:

driving, by the connecting member, the decorative member lens to move in response to a movement of the lens.

10. The method for controlling a decorative member lens of claim 8, wherein the decorative member lens is fixedly coupled to the decorative member;

wherein the driving the decorative member lens to move comprises:

driving, by the driving mechanism, the decorative member to move such that the decorative member lens is driven to move.

11. The method for controlling a decorative member lens of claim 8, wherein the driving mechanism comprises a lifting member, the decorative member comprises a through hole, the lifting member is provided in the through hole, the lifting member comprises a groove, the decorative member lens is mounted in the groove;

wherein the driving the decorative member lens to move comprises:

driving, by the driving mechanism, the lifting member to move such that the decorative member lens is driven to move.

12. An electronic device implementing the method of claim 8, comprising:

a camera component comprising a lens;

a decorative member lens spaced from the lens;

a driving mechanism coupled to the decorative member lens;

a processor, configured to:

detect an operating state of the camera component in real time;

control the driving mechanism to drive the decorative member lens to move away from the lens in response to detecting that the camera component is switched into the operating state or in response to a fall of the electronic device; and     control the driving mechanism to drive the decorative member lens to move towards the lens in response to detecting that the operating state of the camera component ends.

13. A non-transitory computer-readable storage medium having stored therein instructions that, when executed by a processor of an electronic device, causes the electronic device to perform a method for controlling a decorative member lens;

wherein the electronic device comprises a camera component, a decorative member and a decorative member lens, the camera component comprises a motor and a lens, the motor is configured to drive the lens to move, the decorative member is provided relative to the camera component, the decorative member lens is mounted on the decorative member, and the decorative member lens is spaced from the lens,     the method comprising:

detecting an operating state of the camera component in real time;

driving the decorative member lens to move away from the lens in response to detecting that the camera component is switched into the operating state;

driving the decorative member lens to move towards the lens in response to detecting that the operating state of the camera component ends; and     driving the decorative member lens to move away from the lens in response to a fall of the electronic device.

14. The non-transitory computer-readable storage medium of claim 13, wherein the driving mechanism comprises a connecting member, the lens is fixedly coupled to the decorative member lens through the connecting member;

wherein the driving the decorative member lens to move comprises:

driving, by the connecting member, the decorative member lens to move in response to a movement of the lens.

15. The non-transitory computer-readable storage medium of claim 13, wherein the decorative member lens is fixedly coupled to the decorative member;

wherein the driving the decorative member lens to move comprises:

driving, by the driving mechanism, the decorative member to move such that the decorative member lens is driven to move.

16. The non-transitory computer-readable storage medium of claim 13, wherein the driving mechanism comprises a lifting member, the decorative member comprises a through hole, the lifting member is provided in the through hole, the lifting member comprises a groove, the decorative member lens is mounted in the groove;

wherein the driving the decorative member lens to move comprises:

driving, by the driving mechanism, the lifting member to move such that the decorative member lens is driven to move.

\* \* \* \* \*